US012798322B2

(12) United States Patent
Tonkovich et al.

(10) Patent No.: US 12,798,322 B2
(45) Date of Patent: Nov. 17, 2026

(54) VEHICLE ATTITUDE CONTROL SYSTEM AND METHOD FOR TRACTION MANAGEMENT

(71) Applicants: Aleksander Tonkovich, Keego Harbor, MI (US); Eric R Thompson, Lake Orion, MI (US); Colin M Cole, Oxford, MI (US)

(72) Inventors: Aleksander Tonkovich, Keego Harbor, MI (US); Eric R Thompson, Lake Orion, MI (US); Colin M Cole, Oxford, MI (US)

(73) Assignee: FCA US LLC, Auburn Hills, MI (US)

( * ) Notice: Subject to any disclaimer, the term of this patent is extended or adjusted under 35 U.S.C. 154(b) by 491 days.

(21) Appl. No.: 17/583,465

(22) Filed: Jan. 25, 2022

(65) Prior Publication Data

US 2022/0234412 A1 Jul. 28, 2022

Related U.S. Application Data

(60) Provisional application No. 63/142,321, filed on Jan. 27, 2021.

(51) Int. Cl.
*B60G 17/015* (2006.01)
*B60G 9/00* (2006.01)
(Continued)

(52) U.S. Cl.
CPC ......... *B60G 21/106* (2013.01); *B60G 17/015* (2013.01); *B60G 17/025* (2013.01); (Continued)

(58) Field of Classification Search
CPC ................ B60G 21/106; B60G 17/015; B60G 17/0165; B60G 17/025; B60G 2202/135; B60G 2204/1224; B60G 2401/16; B60G 2500/30; B60G 2500/32; B60G 2500/326; B60G 9/00; B60G 2200/30; B60G 2202/42; B60G 21/0556; B60G 21/0558; B60G 2202/40; B60G 2300/07; B60G 2400/10; B60G 2400/252; B60G 2400/82;
(Continued)

(56) References Cited

U.S. PATENT DOCUMENTS

| | | | | |
|---|---|---|---|---|
| 10,486,699 | B2 | 11/2019 | Lu et al. | |
| 2005/0004732 | A1* | 1/2005 | Berry .................. | B60W 50/045 701/36 |

(Continued)

FOREIGN PATENT DOCUMENTS

| | | | | |
|---|---|---|---|---|
| CA | 3043481 | A1 | 5/2018 | |
| DE | 102009005895 | A1 * | 7/2010 | ........... B60G 11/183 |

(Continued)

OTHER PUBLICATIONS

Description Translation for EP 3,409,517 from Espacenet (Year: 2018).*

*Primary Examiner* — Daniel M. Keck
(74) *Attorney, Agent, or Firm* — Jeremy J. Klobucar

(57) ABSTRACT

A vehicle includes a chassis, an axle, and a sway bar assembly coupled between the chassis and the axle. At least one actuator is configured to move the sway bar assembly relative to the axle to thereby move at least a portion of the chassis toward or away from the axle to adjust an attitude of the vehicle.

8 Claims, 14 Drawing Sheets

(51) Int. Cl.

| | |
|---|---|
| ***B60G 17/0165*** | (2006.01) |
| ***B60G 17/02*** | (2006.01) |
| ***B60G 21/055*** | (2006.01) |
| ***B60G 21/10*** | (2006.01) |
| ***B60K 35/10*** | (2024.01) |
| ***B60K 35/22*** | (2024.01) |
| ***B60K 35/28*** | (2024.01) |

(52) U.S. Cl.
CPC ........ *B60K 35/10* (2024.01); *B60G 2202/135* (2013.01); *B60G 2204/1224* (2013.01); *B60G 2401/16* (2013.01); *B60G 2500/32* (2013.01); *B60G 2500/326* (2013.01); *B60K 35/22* (2024.01); *B60K 2360/1438* (2024.01)

(58) Field of Classification Search
CPC .............. B60G 2400/824; B60K 37/06; B60K 2370/1438; B60K 2370/152; B60K 2370/167; B60K 2370/172
USPC ........................................................ 280/5.507
See application file for complete search history.

(56) References Cited

U.S. PATENT DOCUMENTS

| | | | | |
|---|---|---|---|---|
| 2008/0106055 | A1* | 5/2008 | Pinkos | F16D 27/118 280/124.106 |
| 2021/0252932 | A1* | 8/2021 | Morgan | B60W 50/082 |
| 2022/0144037 | A1* | 5/2022 | Rosinski | B60G 17/0162 |

FOREIGN PATENT DOCUMENTS

| | | | | | |
|---|---|---|---|---|---|
| DE | 102015103354 | A1 | * | 9/2016 | B60G 11/181 |
| EP | 3409517 | A1 | * | 12/2018 | B60G 17/0157 |
| WO | WO-2020020718 | A1 | * | 1/2020 | B60G 17/016 |

* cited by examiner

VEHICLE ATTITUDE CONTROL SYSTEM AND METHOD FOR TRACTION MANAGEMENT

CROSS REFERENCE TO RELATED APPLICATION

This application claims the benefit of U.S. Provisional Application No. 63/142,321, filed Jan. 27, 2021, the contents of which are incorporated herein by reference thereto.

FIELD

The present application relates generally vehicle suspension systems and, more particularly, systems for controlling vehicle suspension to adjust an attitude of the vehicle independent of the surface the tires are on.

BACKGROUND

Off-roading in vehicles has increased in popularity. However, vehicle geometry and traction limitations often limit off-road performance or make some objects or terrain impassable. For example, when climbing a steep grade, the attitude of the vehicle is at a steep angle and the weight over the front axle can decrease, thereby potentially reducing traction. This can negatively impact driver confidence because the front of the vehicle may feel like it is lifting off the ground. The same situation may occur with the rear axle when descending down a steep grade. While air spring systems exist for ride height adjustment, and bumper mounted winches can be used to pull the front of the vehicle down to improve traction, neither allows for independent driver control. Accordingly, there is a desire for improvement in the relevant art.

SUMMARY

In accordance with one example aspect of the invention, a vehicle is provided. In the example embodiment, the vehicle includes a chassis, an axle, and a sway bar assembly coupled between the chassis and the axle. At least one actuator is configured to move the sway bar assembly relative to the axle to thereby move at least a portion of the chassis toward or away from the axle to adjust an attitude of the vehicle.

In addition the foregoing, the described vehicle may include one or more of the following features: wherein the at least one actuator is coupled to the sway bar assembly; a disconnect mechanism configured to disconnect left and right sides of the sway bar assembly such that the left and right sides of the sway bar assembly are independently adjustable by the at least one actuator relative to the axle; and wherein the sway bar assembly includes a lateral bar extending in a generally cross-car direction, a pair of opposed lateral arms rotatably coupled to opposite ends of the lateral bar, and a pair of opposed coupler links each rotatably coupled between one of the lateral arms and the axle, wherein the at least one actuator is configured to rotate the lateral arms relative to the lateral bar to adjust the vehicle attitude.

In addition the foregoing, the described vehicle may include one or more of the following features: wherein the sway bar assembly further includes a pair of opposed end plates disposed at each end of the lateral bar and coupled to the chassis; wherein the axle comprises a front axle and a rear axle, and wherein the sway bar assembly includes a front sway bar assembly coupled between the front axle and the chassis, and a rear sway bar assembly coupled between the rear axle and the chassis; and wherein the at least one actuator includes a front left actuator configured to selectively move a front left of the chassis relative to the front axle to adjust the vehicle attitude, a front right actuator configured to selectively move a front right of the chassis relative to the front axle to adjust the vehicle attitude, a rear left actuator configured to selectively move a rear left of the chassis relative to the rear axle to adjust the vehicle attitude, and a rear right actuator configured to selectively move a rear right of the chassis relative to the rear axle to adjust the vehicle attitude.

In addition the foregoing, the described vehicle may include one or more of the following features: a vehicle attitude adjustment system having a controller in signal communication with the at least one actuator and programmed to operate, based on user input, the at least one actuator to adjust the attitude of the vehicle; wherein user input is received via at least one switch disposed on at least one of an instrument panel and a steering wheel; and wherein user input is received via at least one soft button displayed on a touchscreen disposed within a passenger compartment of the vehicle.

In addition the foregoing, the described vehicle may include one or more of the following features: wherein the controller is further programmed to operate in an autonomous mode, including disconnect left and right sides of the sway bar assembly, receive, from a central database, terrain mapping/GPS track data uploaded to the central database, receive input from one or more sensors indicative of vehicle component locations, and adjust the one or more actuators to position wheels of the vehicle in locations corresponding to predetermined locations in the terrain mapping/GPS track data; and wherein the controller is further programmed to operate in an automatic mode, including disconnecting left and right sides of the sway bar assembly, receive input from one or more sensors indicative of vehicle component locations, and automatically adjust the one or more actuators to position a body of the vehicle as close to horizontal as possible.

In addition the foregoing, the described vehicle may include one or more of the following features: wherein the axle includes a front axle and a rear axle, wherein the sway bar assembly includes a front sway bar assembly and a rear sway bar assembly, wherein each of the front and rear sway bar assemblies includes a disconnect mechanism to selectively operably disconnect left and right sides of the sway bar assembly, and wherein the controller is further programmed to operate in a front/rear mode, including provide user selectable options to adjust the attitude of a front of the vehicle and a rear of the vehicle, connect the disconnect mechanism of each of the front and rear sway bar assemblies, and adjust the one or more actuators to adjust the attitude of the front and/or rear of the vehicle based on the user selected options.

In addition the foregoing, the described vehicle may include one or more of the following features: wherein the axle includes a front axle and a rear axle, wherein the sway bar assembly includes a front sway bar assembly and a rear sway bar assembly, and wherein the controller is further programmed to operate in a left/right mode, including provide user selectable options to adjust the attitude of a left side of the vehicle and a right side of the vehicle, disconnect left and right sides of each of the front and rear sway bar assemblies, and adjust the one or more actuators to adjust the attitude of the left and/or right side of the vehicle based on the user selected options.

In addition the foregoing, the described vehicle may include one or more of the following features: wherein the axle includes a front axle and a rear axle, wherein the sway bar assembly includes a front sway bar assembly and a rear sway bar assembly, and wherein the controller is further programmed to operate in a four corners mode, including provide user selectable options to adjust the attitude of a front left corner of the vehicle, a front right corner of the vehicle, a rear left corner of the vehicle, and a rear right corner of the vehicle, disconnect left and right sides of each of the front and rear sway bar assemblies, and adjust the one or more actuators to adjust the attitude of the front left, front right, rear left, and/or rear right corner of the vehicle based on the user selected options.

In addition the foregoing, the described vehicle may include one or more of the following features: wherein the axle includes a front axle and a rear axle, wherein the sway bar assembly includes a front sway bar assembly and a rear sway bar assembly, wherein each of the front and rear sway bar assemblies includes a disconnect mechanism to selectively operably disconnect left and right sides of the sway bar assembly, and wherein the controller is further programmed to operate in an all up mode, including provide a user selectable option to adjust the attitude of the vehicle to a fully raised position, connect the disconnect mechanism of each of the front and rear sway bar assemblies, and adjust the one or more actuators to adjust the attitude of the vehicle to the fully raised position based on the user selected option.

In addition the foregoing, the described vehicle may include one or more of the following features: wherein the axle includes a front axle and a rear axle, wherein the sway bar assembly includes a front sway bar assembly and a rear sway bar assembly, wherein each of the front and rear sway bar assemblies includes a disconnect mechanism to selectively operably disconnect left and right sides of the sway bar assembly, and wherein the controller is further programmed to operate in an all down mode, including provide a user selectable option to adjust the attitude of the vehicle to a fully lowered position, connect the disconnect mechanism of each of the front and rear sway bar assemblies, and adjust the one or more actuators to adjust the attitude of the vehicle to the fully lowered position based on the user selected option.

In accordance with another example aspect of the invention, a method of performing a method of adjusting the attitude of a vehicle having a chassis, front and rear axles, a front sway bar assembly coupled between the front axle and the chassis, a rear sway bar assembly coupled between the rear axle and the chassis, a disconnect mechanism operably associated with and configured to selectively disconnect left and right sides of each of the front and rear sway bar assemblies, a plurality of actuators operably associated with each of the front and rear sway bar assemblies and configured to move the associated front and rear sway bar assemblies relative to the respective front and rear axles to selectively adjust an attitude of the vehicle is provided. The method includes providing at least one user selectable option to adjust the attitude of the vehicle, determining a user selected option of the provided at least one user selectable option, actuating the disconnect mechanism to connect or disconnect the front and rear sway bar assemblies based on the user selected option, and adjusting, based on the user selected option, one or more actuators of the plurality of actuators to adjust the attitude of the vehicle.

In addition the foregoing, the described method may include one or more of the following features: wherein the vehicle further includes a touchscreen display, and wherein the step of providing at least one user selectable option includes displaying a soft button on the touchscreen display for each user selectable option; and wherein the at least one user selectable option comprises: an autonomous mode configured to adjust the one or more actuators to position wheels of the vehicle in locations corresponding to predetermined locations in terrain mapping/GPS track data received from a central database, an automatic mode configured to automatically adjust the one or more actuators to position a body of the vehicle as close to horizontal as possible, a front/rear mode configured to adjust the one or more actuators to adjust the attitude of a front and rear of the vehicle, a left/right mode configured to adjust the one or more actuators to adjust the attitude of a left side and a right side of the vehicle, a four corners mode configured to adjust the one or more actuators to adjust the attitude of a front left, a front right, a rear left, and a rear right corner of the vehicle, an all up mode configured to adjust the one or more actuators to adjust the attitude of the vehicle to a fully raised position, and an all down mode configured to adjust the one or more actuators to adjust the attitude of the vehicle to a fully lowered position.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

According to the principles of the present application, systems and methods are described for performing a vehicle attitude adjustment operation to manage traction, for example, on off-road courses. In the example embodiments, the system allows a driver to independently adjust a height of the vehicle suspension at all four corners, thereby enabling the driver to adjust the attitude of the vehicle for improved weight balance and driver comfort while ascending, descending, or traversing uneven grades. The system also allows the driver to raise or lower the vehicle independent front-to-rear and left-to-right. This control enables the driver to optimize approach angles when ascending steep grades and/or when descending steep grades, and provide side to side stability and traction, particularly for off camber obstacles.

In some examples, the system includes a user interface (UI) within driver reach to send signals to an electronic control module. The UI provides selection options including an autonomous/automatic mode and a user selectable manual mode. In the autonomous mode, the vehicle receives data (e.g., accelerometer and height sensor data) and automatically positions the vehicle (e.g., in a predetermined position or as close to neutral attitude possible). In the user selectable mode, the UI provides the driver with one or more additional modes. In the example embodiment, a first additional mode provides independent controls for all four corners of the vehicle. A second mode provides the driver with independent front and rear control of the vehicle attitude, a third mode provides the driver with independent side to side control of the vehicle attitude, and fourth/fifth modes provide the driver with independent control for fully raised and fully lowered positions.

In the example system, the electronic control module is in signal communication with one or more actuators disposed on the front and rear sway bars of the vehicle. The actuators can be utilized independently to rotate the front and rear sway bars, which are coupled to the vehicle chassis, to thereby adjust the vehicle attitude. A sway bar disconnecting feature enables independent and simultaneous control of all four corners of the vehicle. When the sway bar is disconnected, the driver is provided with independent front to rear and/or side to side control. As such, the system enables driver control for changing the attitude of the vehicle independent of the surface the tires are on, thereby improving weight transfer and driver confidence, and without an air suspension. However, the systems and methods described herein can be applied to air suspension vehicles by individually controlling the air bags of the vehicle instead of or in addition to using the sway bars.

Figure 1:
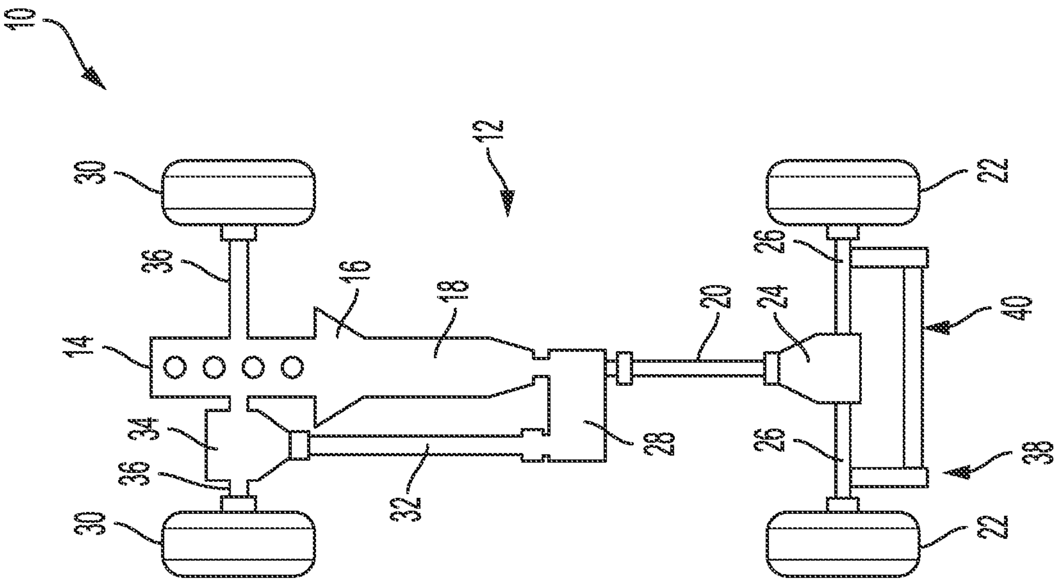
FIG. 1 is a schematic illustration of an example vehicle drivetrain in accordance with the principles of the present application.

With initial reference to FIG. 1, a vehicle 10 in accordance with the principles of the present disclosure is illustrated. In the example embodiment, vehicle 10 includes a propulsion system 12 that generally includes an internal combustion engine 14, a clutch or torque converter 16, and a transmission 18. Reciprocating motion of the engine 14 is converted into rotational motion via torque converter 16 and transmitted to a drive shaft 20 via the transmission 18. Rotational motion of the drive shaft 20 is transferred to rear wheels 22 via a rear differential 24 and rear drive axles 26. A transfer case 28 is configured to transfer rotational motion to front wheels 30 via a front drive shaft 32, front differential 34, and front drive axles 36. In some examples, the transfer case 28 includes a shifting mechanism (e.g., shift fork) configured to selectively disengage the rear axles 26 and/or the front axles 36 from the propulsion system 12.

Figure 3:
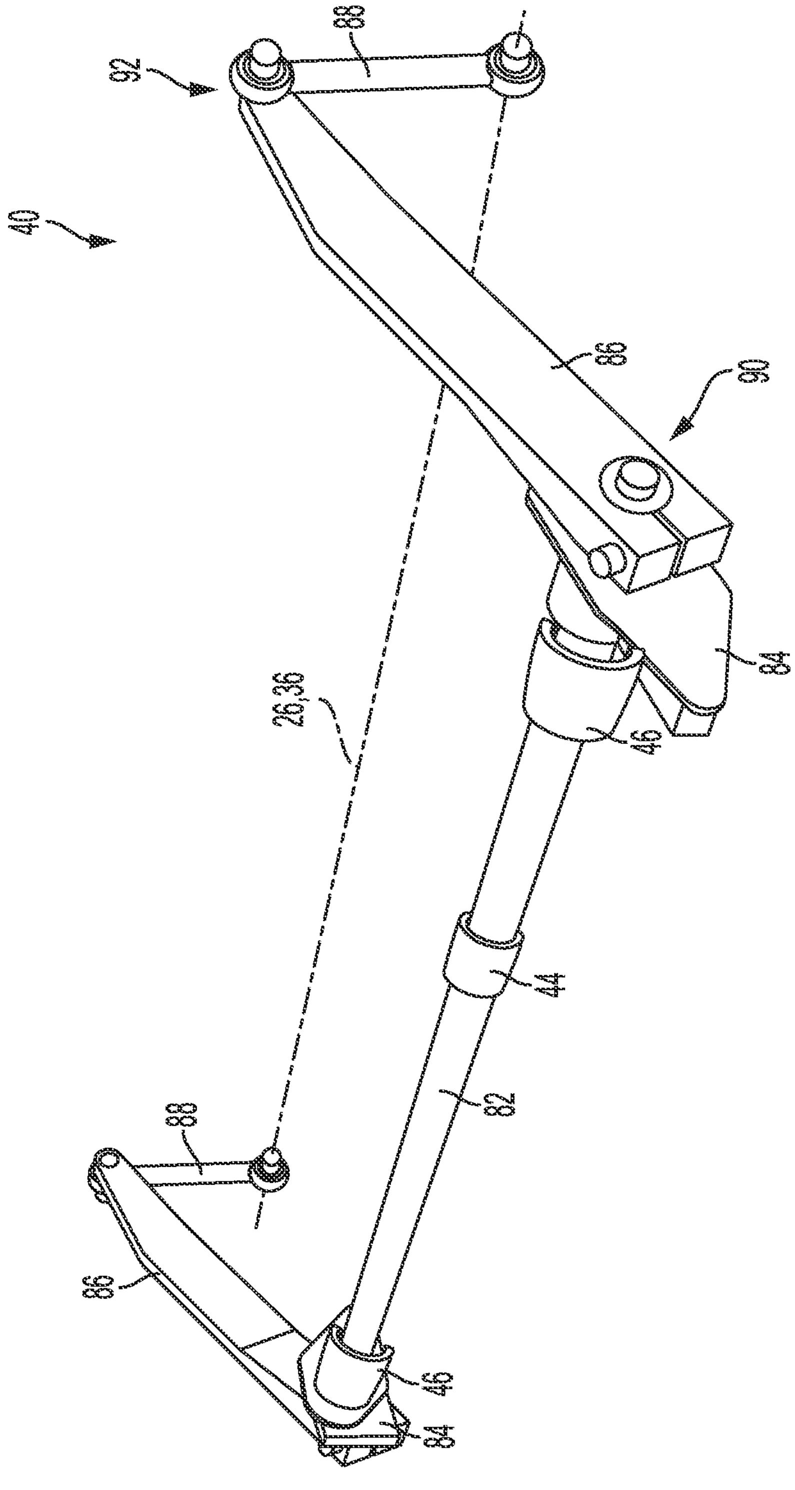
FIG. 3 is a perspective view of an example sway bar assembly that may be utilized with the vehicle of FIG. 1, in accordance with the principles of the present application.

In the example embodiment, vehicle 10 also includes a suspension system 38 having front and rear sway bars 40 (only rear shown) coupled between a vehicle chassis/frame 42 (see FIG. 4A) and respective front axles 36 and rear axles 26. As described herein in more detail, the suspension system 38 is configured to facilitate independent adjustment of the attitude or positioning of the frame 42 relative to the axles 26, 36 and the ground, to thereby improve vehicle weight transfer and driver confidence when traversing difficult terrain. As shown in FIG. 3, each sway bar assembly 40 includes a sway bar disconnect mechanism 44 configured to selectively separate opposite sides of the sway bar assembly 40. Further, each side of the sway bar assembly 40 includes an axle actuator 46 configured to move the vehicle frame 42 toward or away from the associated axle 26, 36, as described herein in more detail. It will be appreciated that the disconnect mechanism 44 and axle actuators 46 may have various structural configurations including electromechanical, pneumatic, hydraulic, magnetic, or other suitable configuration that enables suspension system 38 to function as described herein.

Figure 2:
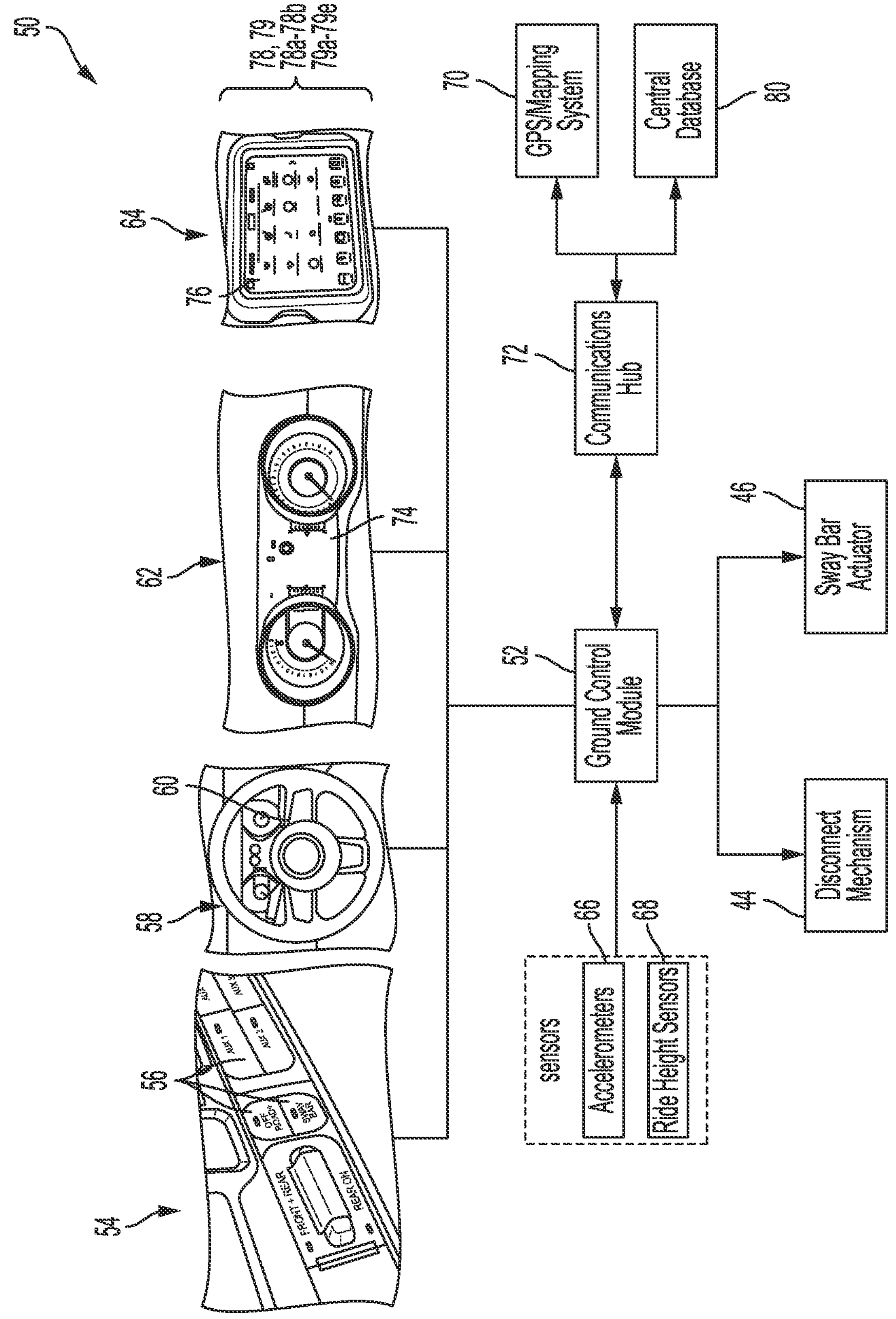
FIG. 2 is a schematic diagram of an example vehicle attitude adjustment system of the vehicle shown in FIG. 1, in accordance with the principles of the present application.

With additional reference to FIG. 2, vehicle 10 further includes a vehicle attitude adjustment system 50 having a Ground Control Module (GCM) or controller 52 configured to enable vehicle 10 to adjust a position of the vehicle frame 42 relative to and independent of the axles 26, 36 and/or the ground surface. Such attitude adjustment helps to improve vehicle weight transfer and driver confidence when traversing difficult terrain such as steep grades. In the illustrated example, GCM 52 is in signal communication with a plurality of vehicle systems/components including: the disconnect mechanisms 44, the axle actuators 46, an instrument panel 54 having one or more buttons or switches 56, a steering wheel 58 with one or more button or switches 60, an instrument panel cluster 62, a display 64, sensors such as accelerometers 66 and ride height sensors 68, a GPS/mapping system 70, and a communications hub 72 (e.g., RF hub).

In the example embodiment, the instrument panel 54 provides one or more switches 56 configured to assist the user in operating the vehicle attitude adjustment system 50. For example, switch 56 may enable an off-road mode configured to switch vehicle 10 between an on-road mode and an off-road mode. Activation of the off-road mode may be required to activate and/or initiate the attitude adjustment operation described herein. In other examples, switches 56 may enable the user to manually adjust the vehicle attitude as described herein. Additionally or alternatively, the steering wheel 58 may include one or more buttons or switches 60 for attitude adjustment activation/operation.

In the example embodiment, the instrument panel cluster 62 includes a display 74 configured to display a status and/or diagnostic message from the vehicle attitude adjustment system 50. The display 64 includes a user interface or touch screen 76 configured to display one or more soft buttons 78 to enable a user to activate/operate the attitude adjustment operation, as described below. As noted above, switches 56, 60 may also be utilized for activation and/or operation of the vehicle attitude adjustment system 50 and its function. One or more accelerometers 66 are coupled to vehicle 10 and configured to provide accelerometer signals indicative of the measured acceleration of vehicle 10 in various directions. Ride height sensors 68 are coupled to the vehicle 10 in various locations (e.g., all four corners) and are configured to provide signals indicative of a distance of the separation between the vehicle frame 42 and the axles 26, 36 (or some other distance to determine vehicle attitude).

In the example implementation, the GPS/mapping system 70 is configured to communicate with one or more satellites or databases to guide and/or determine a location of the vehicle. The communications hub 72 is a vehicle communication system or device (e.g., transceiver) configured to communicate with a central database or server 80 via radio frequency, cellular network, satellite network, etc. Using one of these network connections, the vehicle 10 is able to access the secure server or network 80. The terms "secure server" and "secure network" as used herein refers to one or more remote servers that is/are only accessible to authorized users, such as a particular type or brand of vehicle.

With reference now to FIG. 3, the sway bar assembly 40 will be described in more detail. As previously noted, the sway bar assembly 40 is utilized to adjust the attitude of the vehicle. In the example embodiment, the sway bar assembly 40 generally includes a lateral bar 82, a pair of opposed end members or plates 84, a pair of opposed later members or arms 86, and a pair of opposed coupler bars or links 88. The lateral bar 82 extends in a general cross-car direction and the end plates 84 are coupled at opposite ends of the lateral bar 82. The end plates 84 are configured to couple to the frame 42. Each lateral arm 86 includes a first end 90 and an opposite second end 92. The first end 90 is rotatably coupled to one end of the lateral bar 82, and the second end 92 is rotatably coupled to one end of the coupler link 88. The opposite end of the coupler link 88 is configured to rotatably couple to the axle 26, 36 or other component coupled thereto (e.g., see joint 94 shown in FIG. 4A).

In the example embodiment, the previously described disconnect mechanism 44 is operably coupled to the lateral bar 82 and configured to operatively separate left and right sides of the sway bar assembly 40. Axle actuators 46 are coupled to the ends of lateral bar 82 and configured to rotate the associated lateral arm 86 in a clockwise or counter-clockwise direction relative to the end of the lateral bar 82. In this way, the axle actuators 46 (e.g., electric motors) are utilized to raise and lower the vehicle frame 42 relative to the solid axle 26, 36.

Figure 4A:
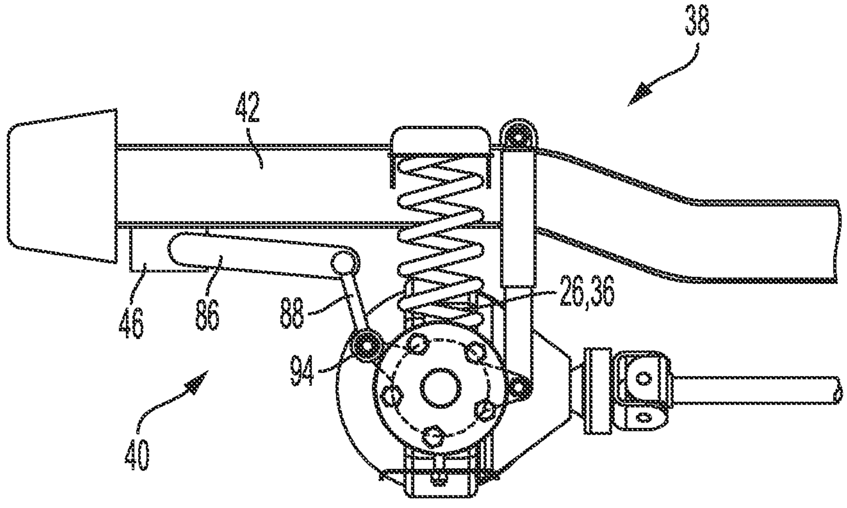
FIG. 4A is a side view of an example sway bar assembly in a first position attached to a portion of the vehicle, in accordance with the principles of the present application.
Figure 4B:
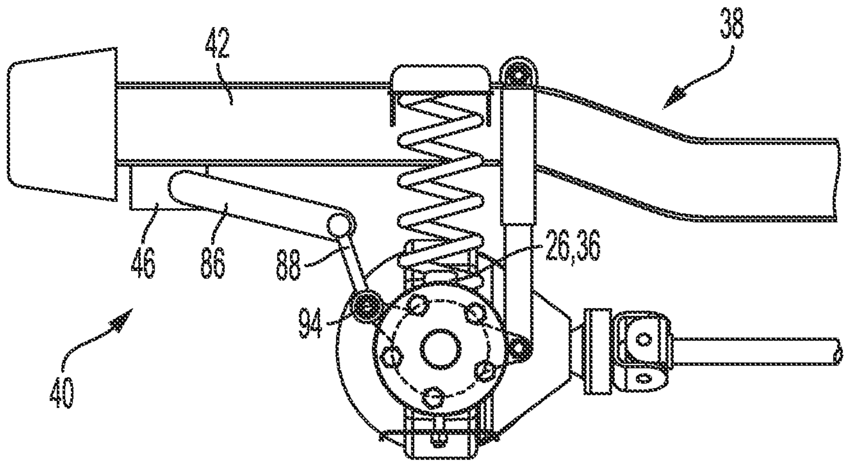
FIG. 4B is a side view of the sway bar assembly shown in FIG. 4A and in a second position, in accordance with the principles of the present application.
Figure 4C:
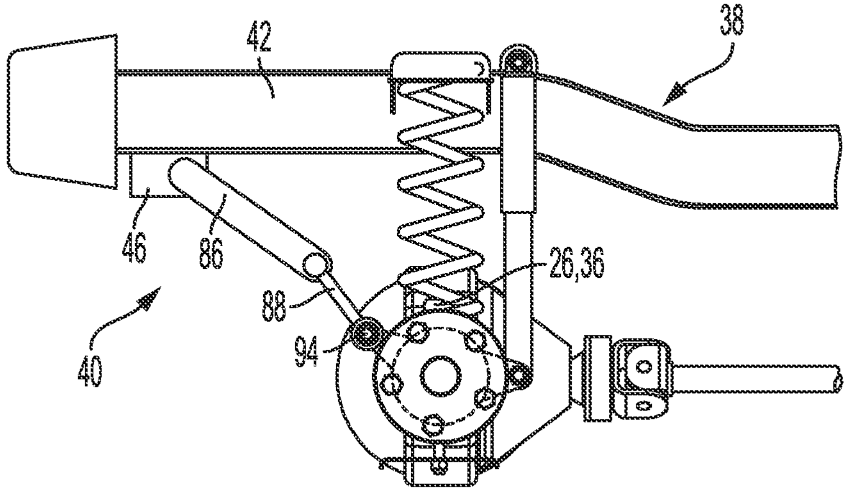
FIG. 4C is a side view of the sway bar assembly shown in FIG. 4A and in a third position, in accordance with the principles of the present application.

Referring now to FIGS. 4A-4C, an example operation of the sway bar assembly 40 at one corner of the vehicle 10 is shown. FIG. 4A illustrates the sway bar assembly 40 in a fully lowered position with vehicle frame 42 in its closest position to the axle 26, 36. FIG. 4B illustrates the sway bar assembly 40 in an intermediate position after the axle actuator 46 rotates lateral arm 86 clockwise (as shown in FIG. 4B). In this position, the vehicle frame 42 is raised away from the axle 26, 36 compared to the fully lowered position. FIG. 4C illustrates the sway bar assembly 40 in a fully or nearly fully raised position with the vehicle frame 42 in its farthest position away from the axle 26, 36. In this position, the axle actuator 46 further rotates lateral arm 86 clockwise such that the lateral arm 86 and coupler link 88 are parallel or substantially parallel. Operating the axle actuator 46 to rotate lateral arm 86 counter-clockwise lowers the frame 42 to the fully lowered position or any position therebetween.

As noted above, the vehicle attitude adjustment system 50 is configured to selectively adjust the vehicle attitude. In the example embodiment, the vehicle attitude adjustment can be initiated and performed automatically or manually. As such, in the example embodiment, touch screen 76 is configured to display a first soft button 78*a* for autonomous/automatic operation, and a second soft button 78*b* for manual operation. For automatic operation, the first soft button 78*a* allows a user to activate an automatic adjustment of vehicle attitude (as opposed to manual adjustment). Soft button 78*a* enables the user to command the GCM 52 to automatically adjust the vehicle attitude to a position based on predetermined data or as close to neutral (i.e., horizontal) as possible without surpassing predefined thresholds (e.g., mechanical limits, safety limits, etc.).

If manual control of the attitude adjustment operation is desired, the driver can press the second soft button 78*b*. Such action may then activate or display soft buttons 79 for specific manual adjustment options. In the example embodiment, manual adjust includes five additional modes. The first mode, selected by soft button 79*a*, enables independent control of all four corners of the vehicle 10. The second mode, selected by soft button 79*b*, enables independent control of the front and rear of the vehicle 10. The third mode, selected by soft button 79*c*, enables independent side-to-side control of the vehicle. The fourth mode, selected by soft button 79*d*, enables all up control to lift the chassis 42 to a fully raised position. The fifth mode, selected by soft button 79*e*, enables all down control to lower the chassis 42 to a fully lowered position. Example operations are described below.

Figure 5:
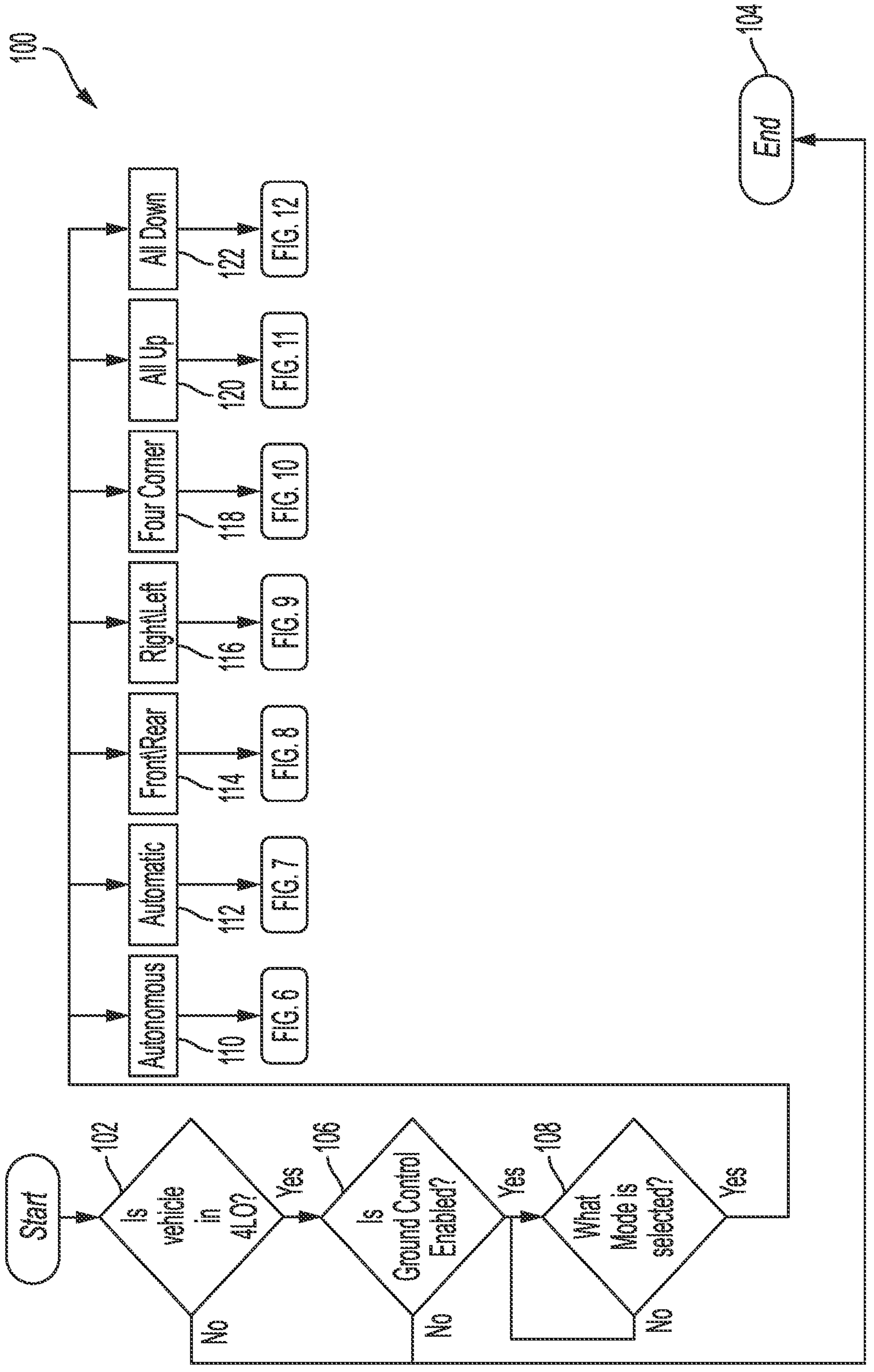
FIG. 5 is a flow diagram of an example method of operating the vehicle attitude adjustment system, in accordance with the principles of the present application.

FIG. 5 illustrates an example method 100 of operating the vehicle attitude adjustment system 50. In the example embodiment, the method begins at step 102 and controller 52 determines if vehicle 10 is in a predetermined gear such as, for example, four-wheel-drive LO. If no, control proceeds to step 104 and the operation ends. If yes, control proceeds to step 106 and controller 52 determines if ground control attitude adjustment is enabled, for example, via switches 56, 60. If no, control proceeds to step 104. If yes, control proceeds to step 108 and controller 52 determines which vehicle attitude adjustment mode is selected. If no adjustment mode is selected, control proceeds to step 104. If an adjustment mode is selected, control determines which adjustment mode is selected from: Autonomous Mode 110, Automatic Mode 112, Front/Rear Mode 114, Right/Left Mode 116, Four Corners Mode 118, All Up Mode 120, and All Down Mode 122. Each mode is described in further detail below.

Figure 6:
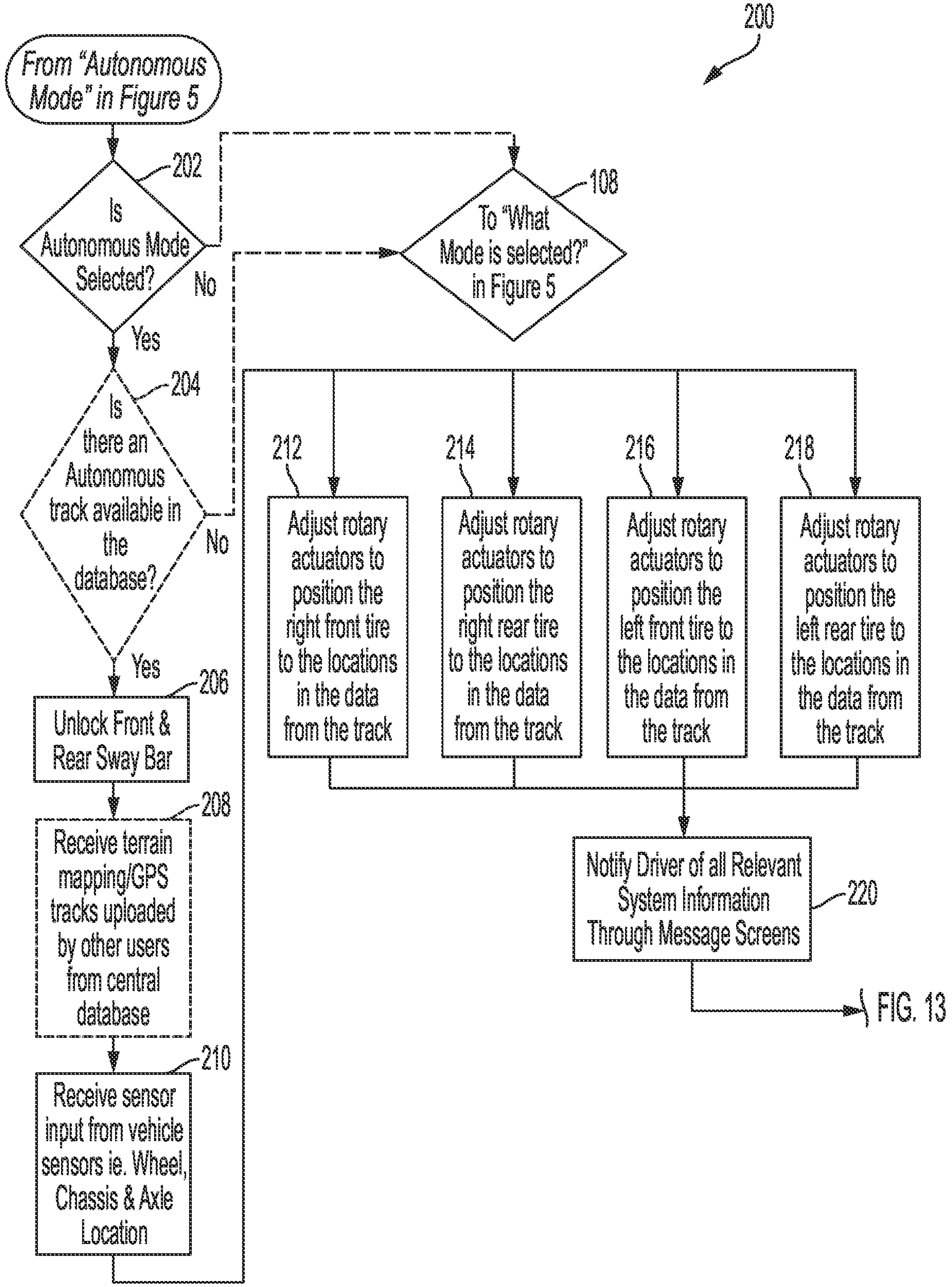
FIG. 6 is a flow diagram of an example method of operating the vehicle attitude adjustment system in an autonomous adjustment mode, in accordance with the principles of the present application.

FIG. 6 illustrates an example method 200 of operating the vehicle attitude adjustment system 50 in the Autonomous Mode 110. In the example embodiment, the method begins at step 202 and controller 52 determines if Autonomous Mode is selected, for example, via touch screen 76. If no, control returns to step 108. If yes, control proceeds to step 204 and control determines if there is an autonomous track available in the central database 80. For example, a predefined/prerecorded track or route may be available for a particular location of the vehicle 10. If an autonomous track is not available, control returns to step 108 for user selection of a new/different mode. If an autonomous track is available, controller 52 unlocks the front and rear sway bars 40 via disconnect mechanisms 44 at step 206. At step 208, controller 52 receives terrain mapping/GPS tracks uploaded by other users from the central database 80. At step 210, controller 52 receives sensor input from vehicles sensors (e.g., wheel, chassis, and axle location).

At step 212, controller 52 adjusts actuators 46 to position the right front tire 30 to the predetermined location(s) in the track data. At step 214, control adjusts actuators 46 to position the right rear tire 22 to the predetermined location(s) in the track data. At step 216, control adjusts actuators 46 to position the left front tire 30 to the predetermined location(s) in the track data. At step 218, control adjusts actuators 46 to position the left rear tire 22 to the predetermined location(s) in the track data. Steps 212-218 may be performed simultaneously or in any desired sequence. At step 220, control provides notifications to the driver of relevant system information through messaging screens (e.g., displays 64, 74). Example messages could indicate the vehicle attitude adjustment is pending or complete, orientation of the vehicle chassis, adjustment duration, etc. Control can then proceed to optional system data operations shown in FIG. 13.

Figure 7:
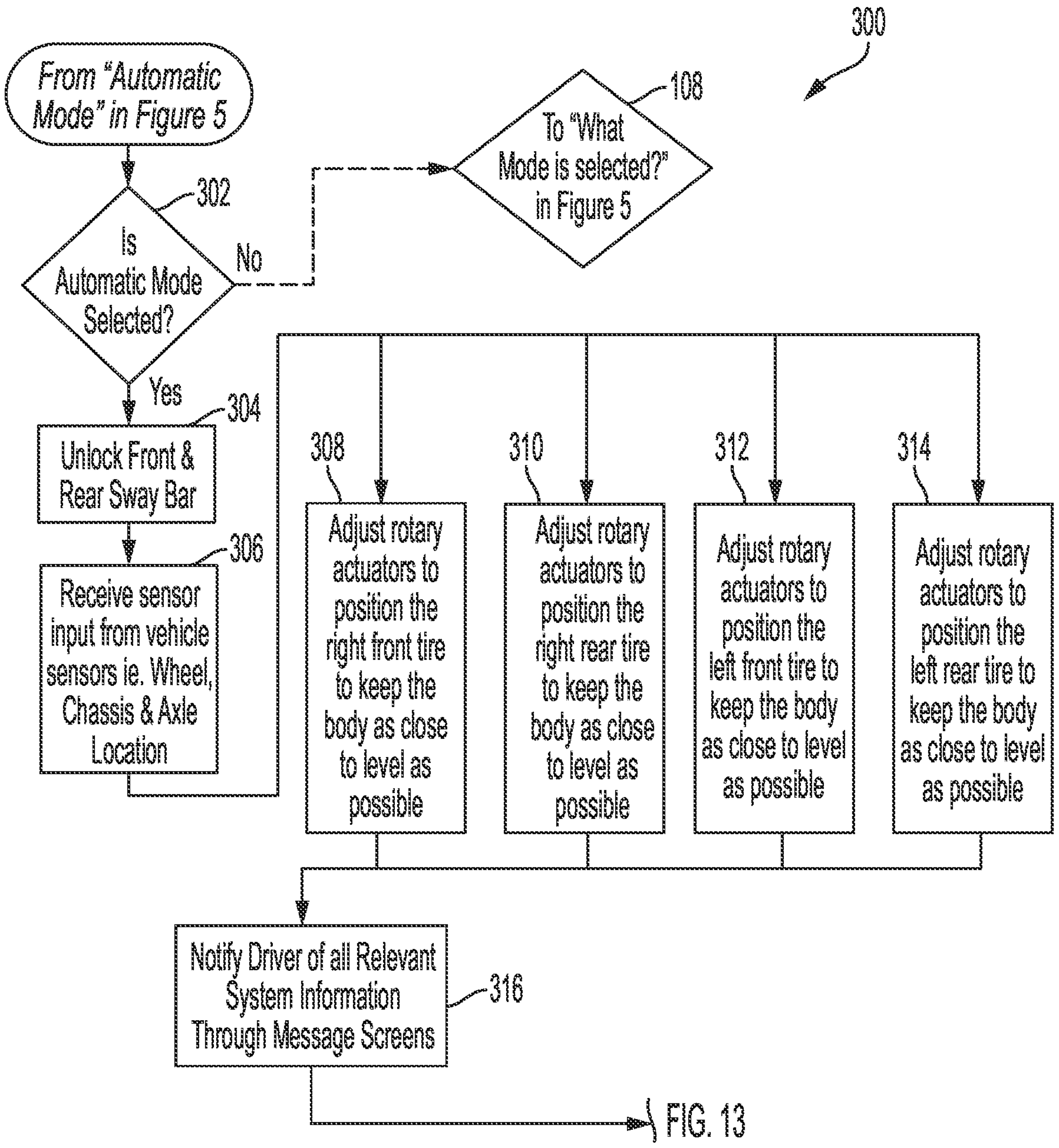
FIG. 7 is a flow diagram of an example method of operating the vehicle attitude adjustment system in an automatic adjustment mode, in accordance with the principles of the present application.

FIG. 7 illustrates an example method 300 of operating the vehicle attitude adjustment system 50 in the Automatic Mode 112. In the example embodiment, the method begins at step 302 and controller 52 determines if Automatic Mode is selected, for example, via touch screen 76. If no, control returns to step 108 (FIG. 5). If yes, at step 304, controller 52 unlocks the front and rear sway bars 40 via disconnect mechanisms 44. At step 306, controller 52 receives sensor input from vehicles sensors (e.g., wheel, chassis, and axle location).

At step 308, controller 52 adjusts actuators 46 to position the right front tire 30 to the predetermined location(s) in the track data. At step 310, control adjusts actuators 46 to position the right rear tire 22 to the predetermined location(s) in the track data. At step 312, control adjusts actuators 46 to position the left front tire 30 to the predetermined location(s) in the track data. At step 314, control adjusts actuators 46 to position the left rear tire 22 to the predetermined location(s) in the track data. Steps 308-314 may be performed simultaneously or in any desired sequence. At step 316, control provides notifications to the driver of relevant system information through messaging screens (e.g., displays 64, 74). Control can then proceed to optional system data operations shown in FIG. 13.

Figure 8:
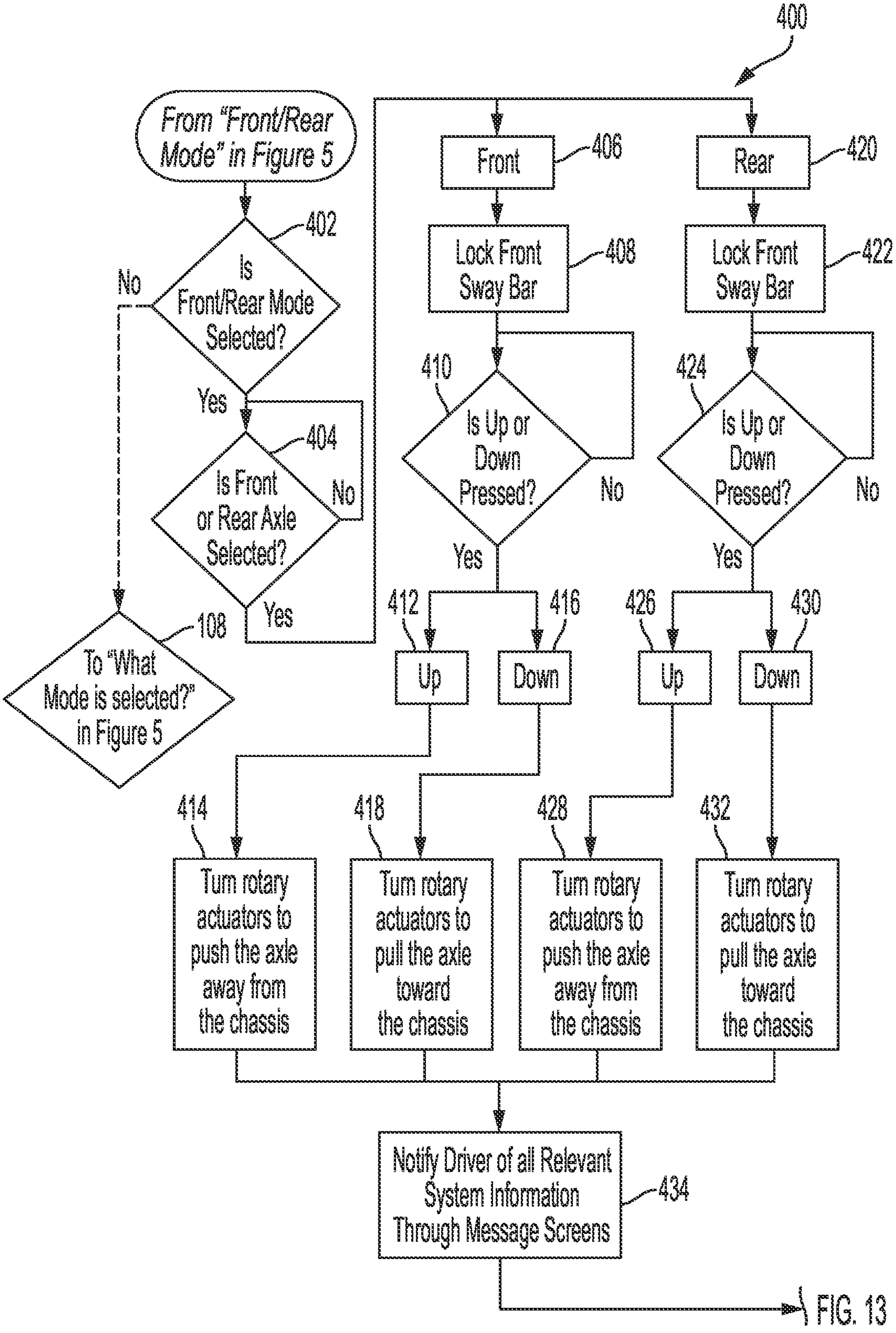
FIG. 8 is a flow diagram of an example method of operating the vehicle attitude adjustment system in a front/rear adjustment mode, in accordance with the principles of the present application.

FIG. 8 illustrates an example method 400 of operating the vehicle attitude adjustment system 50 in the manual control Front/Rear mode 114. In the example embodiment, the method begins at step 402 and controller 52 determines if Front/Rear Mode is selected, for example, via touch screen 76. If no, control returns to step 108 (FIG. 5). If yes, at step 404, controller 52 determines if the front or rear axle is selected by the user, for example, via a soft button on touch screen 76.

If the front axle 36 is selected, control proceeds to step 406 and, at step 408, front sway bar 40 is locked via disconnect mechanism 44. At step 410, control determines if up or down movement is requested, for example, via soft buttons on touch screen 76. If no request, control returns to step 410. If upward movement of the front of the vehicle is requested, control proceeds to step 412, and controller 52 subsequently operates actuators 46 to push the front axle 36 away from the chassis 42 at step 414. Control then proceeds to step 434. If downward movement of the front of the vehicle is requested, control proceeds to step 416, and controller 52 subsequently operates actuators 46 to pull the front axle 36 toward the chassis 42 at step 418. Control then proceeds to step 434.

If the rear axle 26 is selected, control proceeds to step 420 and, at step 422, rear sway bar 40 is locked via disconnect mechanism 44. At step 424, control determines if up or down movement is requested, for example, via soft buttons on touch screen 76. If no request, control returns to step 424. If upward movement of the rear of the vehicle is requested, control proceeds to step 426, and controller 52 subsequently operates actuators 46 to push the rear axle 26 away from the chassis 42 at step 428. Control then proceeds to step 434. If downward movement of the rear of the vehicle is requested, control proceeds to step 430, and controller 52 subsequently operates actuators 46 to pull the rear axle 26 toward the chassis 42 at step 432. Control then proceeds to step 434 where control provides notifications to the driver of relevant system information through messaging screens (e.g., displays 64, 74). Control can then proceed to optional system data operations shown in FIG. 13.

Figure 9:
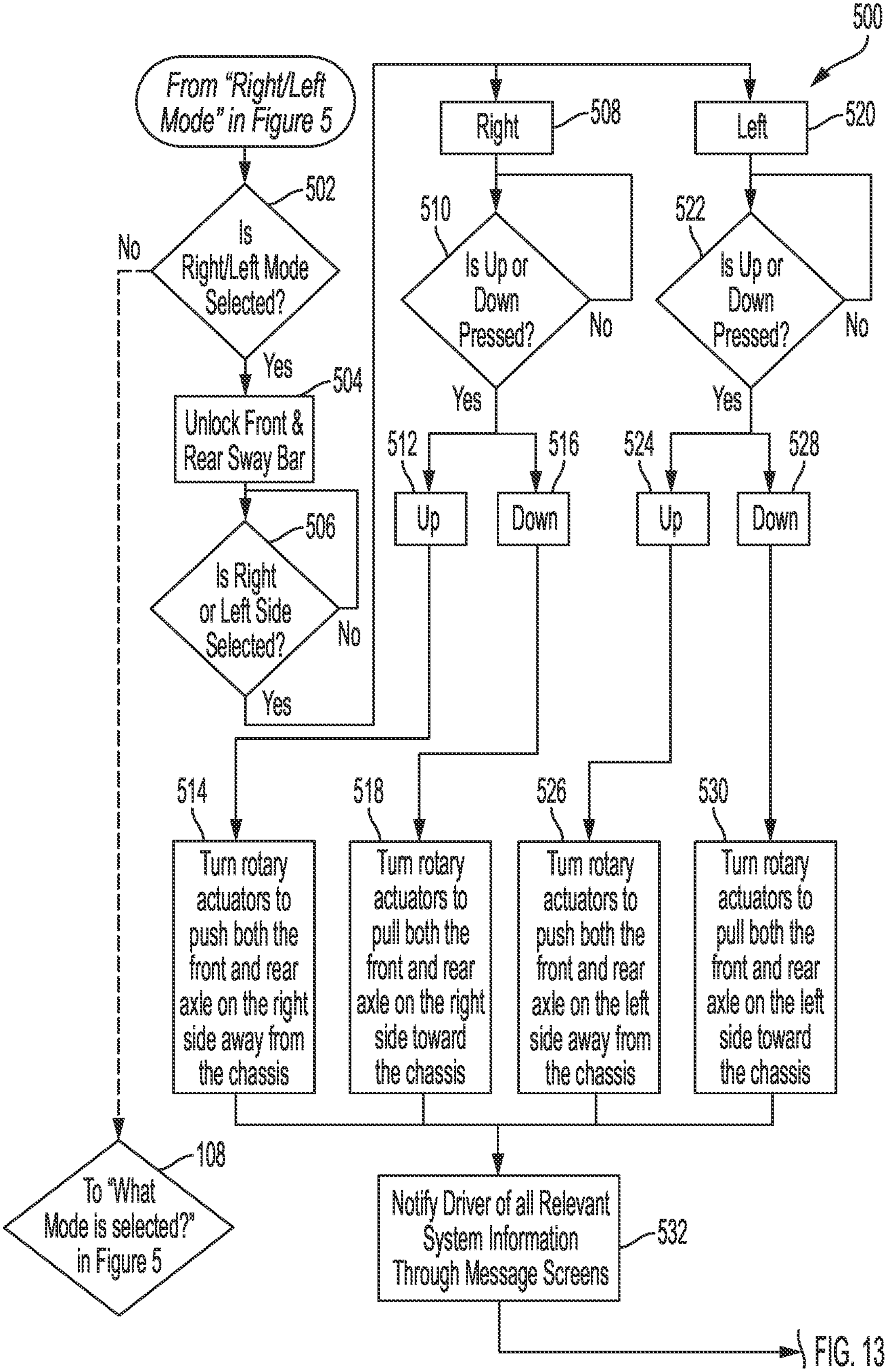
FIG. 9 is a flow diagram of an example method of operating the vehicle attitude adjustment system in a left/right adjustment mode, in accordance with the principles of the present application.

FIG. 9 illustrates an example method 500 of operating the vehicle attitude adjustment system 50 in the manual control Right/Left mode 116. In the example embodiment, the method begins at step 502 and controller 52 determines if Right/Left Mode is selected, for example, via touch screen 76. If no, control returns to step 108 (FIG. 5). If yes, at step 504, controller 52 unlocks the front and rear sway bars 40 via disconnect mechanism 44. At step 506, control determines if the right or left side is selected by the user, for example, via a soft button on touch screen 76.

If the right side is selected, control proceeds to step 508 and, at step 510, determines if up or down movement is requested, for example, via soft buttons on touch screen 76. If no request, control returns to step 510. If upward movement of the right side of the vehicle is requested, control proceeds to step 512, and controller 52 subsequently operates actuators 46 to push both the front and rear axles 36, 26 on the vehicle right side away from the chassis 42 at step 514. Control then proceeds to step 532. If downward movement of the right side of the vehicle is requested, control proceeds to step 516, and controller 52 subsequently operates actuators 46 to pull both the front and rear axles 36, 26 on the vehicle right side toward the chassis 42 at step 518. Control then proceeds to step 532.

If the left side is selected, control proceeds to step 520 and, at step 522, determines if up or down movement is requested, for example, via soft buttons on touch screen 76. If no request, control returns to step 522. If upward movement of the left side of the vehicle is requested, control proceeds to step 524, and controller 52 subsequently operates actuators 46 to push both the front and rear axles 36, 26 on the vehicle left side away from the chassis 42 at step 526.

Control then proceeds to step 532. If downward movement of the left side of the vehicle is requested, control proceeds to step 528, and controller 52 subsequently operates actuators 46 to pull both the front and rear axles 36, 26 on the vehicle left side toward the chassis 42 at step 530. Control then proceeds to step 532. Control then proceeds to step 532 where control provides notifications to the driver of relevant system information through messaging screens (e.g., displays 64, 74). Control can then proceed to optional system data operations shown in FIG. 13.

Figure 10A:
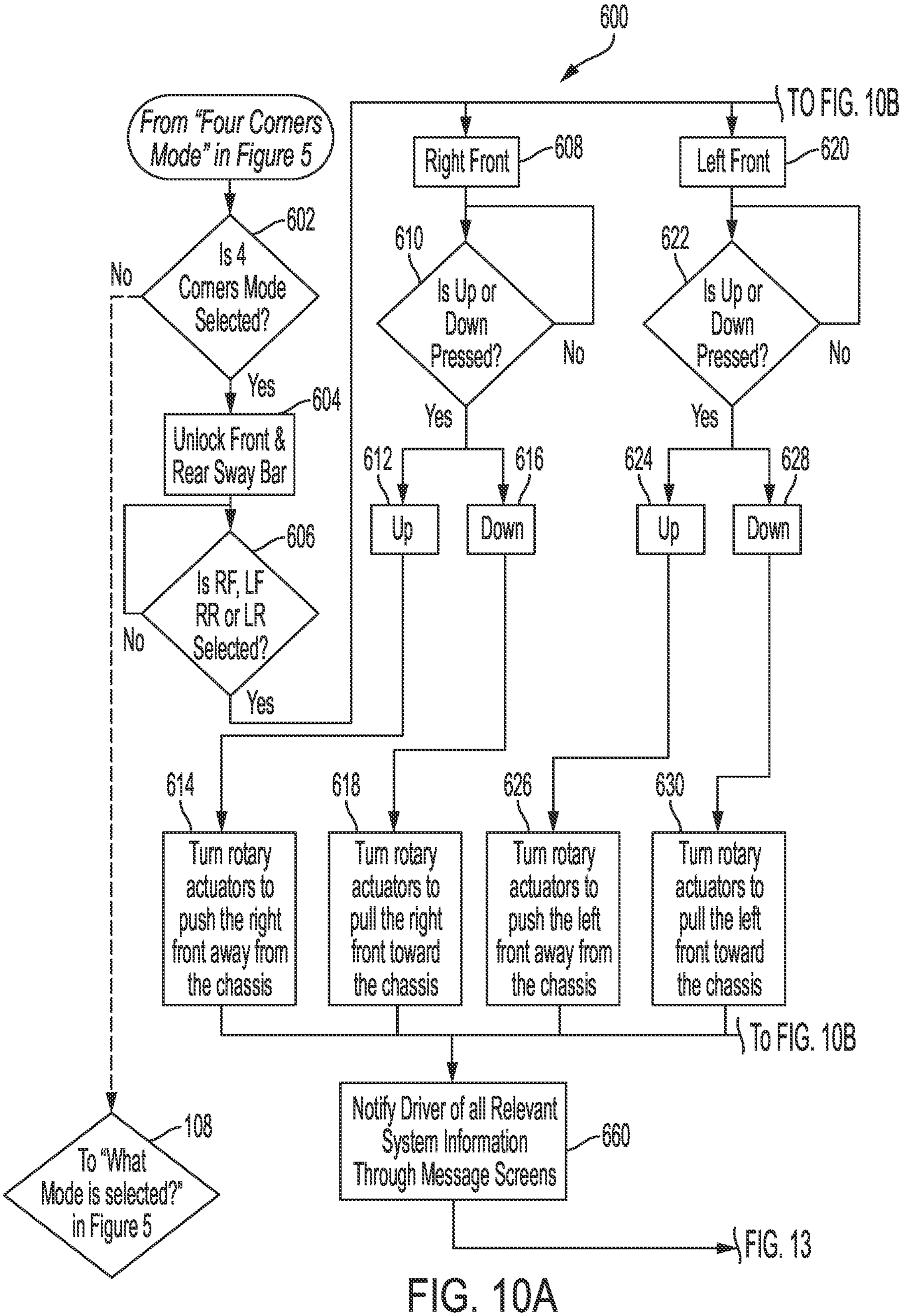
FIGS. 10A-10B illustrate a flow diagram of an example method of operating the vehicle attitude adjustment system in a four corners adjustment mode, in accordance with the principles of the present application.
Figure 10B:
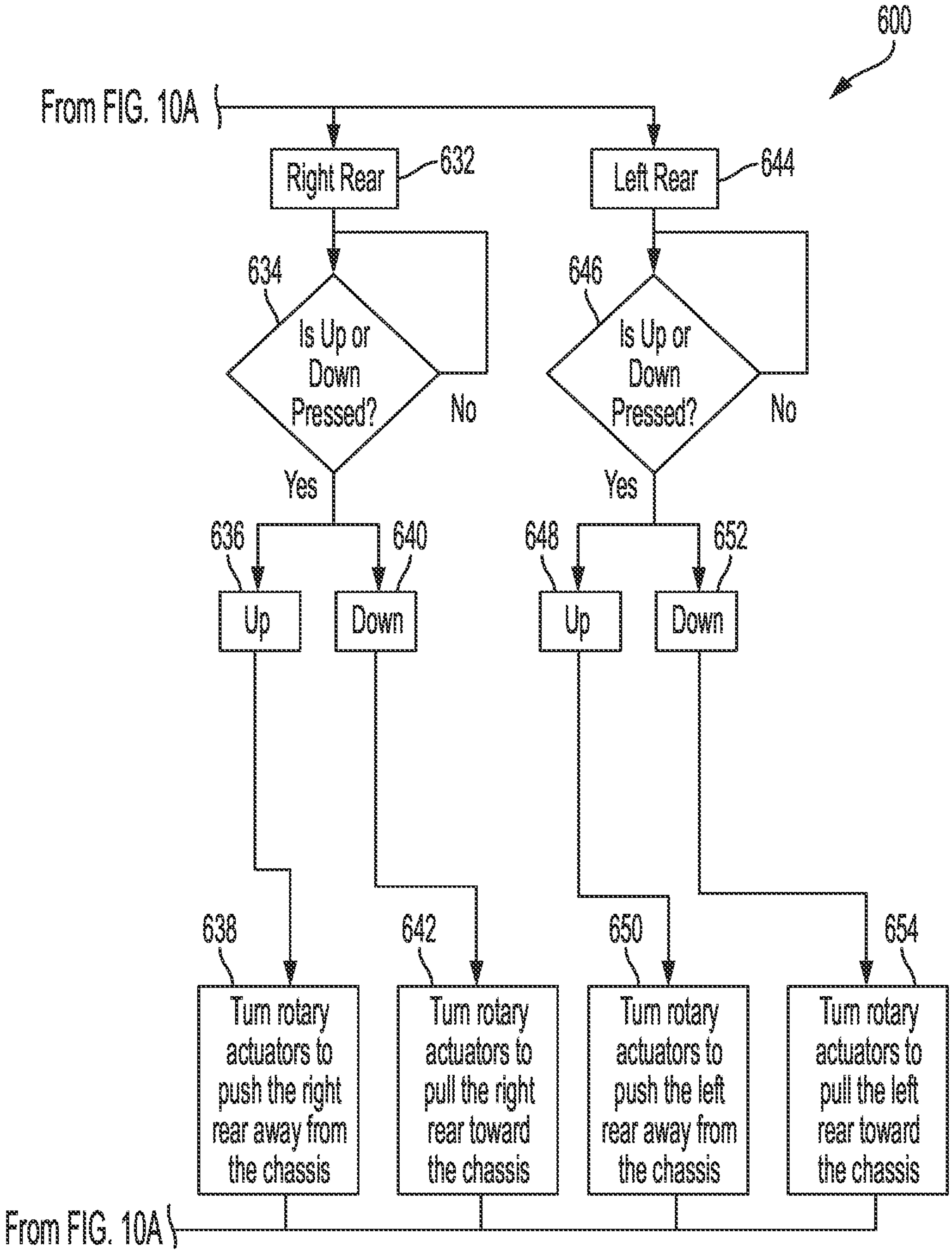

FIGS. 10A-10B illustrate an example method 600 of operating the vehicle attitude adjustment system 50 in the manual control Four Corners Mode 118. In the example embodiment, the method begins at step 602 and controller 52 determines if the Four Corners Mode is selected, for example, via touch screen 76. If no, control returns to step 108 (FIG. 5). If yes, at step 604, controller 52 unlocks the front and rear sway bars 40 via disconnect mechanism 44. At step 606, control determines which corner is selected by the user, for example, via a soft button on touch screen 76.

If the right front is selected, control proceeds to step 608 and, at step 610, determines if up or down movement is requested, for example, via soft buttons on touch screen 76. If no request, control returns to step 610. If upward movement of the right front of the vehicle is requested, control proceeds to step 612, and controller 52 subsequently operates the associated actuator 46 to push the right front axle 36 away from the chassis 42 at step 614. Control then proceeds to step 660. If downward movement of the right front of the vehicle is requested, control proceeds to step 616, and controller 52 subsequently operates actuator 46 to pull the right front axle 36 toward the chassis 42 at step 618. Control then proceeds to step 660.

If the left front is selected, control proceeds to step 620 and, at step 622, determines if up or down movement is requested, for example, via soft buttons on touch screen 76. If no request, control returns to step 622. If upward movement of the left front of the vehicle is requested, control proceeds to step 624, and controller 52 subsequently operates the associated actuator 46 to push the left front axle 36 away from the chassis 42 at step 626. Control then proceeds to step 660. If downward movement of the left front of the vehicle is requested, control proceeds to step 628, and controller 52 subsequently operates actuator 46 to pull the left front axle 36 toward the chassis 42 at step 630. Control then proceeds to step 660.

If the right rear is selected, control proceeds to step 632 and, at step 634, determines if up or down movement is requested, for example, via soft buttons on touch screen 76. If no request, control returns to step 634. If upward movement of the right rear of the vehicle is requested, control proceeds to step 636, and controller 52 subsequently operates the associated actuator 46 to push the right rear axle 26 away from the chassis 42 at step 638. Control then proceeds to step 660. If downward movement of the right rear of the vehicle is requested, control proceeds to step 640, and controller 52 subsequently operates actuator 46 to pull the right rear axle 26 toward the chassis 42 at step 642. Control then proceeds to step 660.

If the left rear is selected, control proceeds to step 644 and, at step 646, determines if up or down movement is requested, for example, via soft buttons on touch screen 76. If no request, control returns to step 646. If upward movement of the left rear of the vehicle is requested, control proceeds to step 648, and controller 52 subsequently operates the associated actuator 46 to push the left rear axle 26 away from the chassis 42 at step 650. Control then proceeds to step 660. If downward movement of the left rear of the vehicle is requested, control proceeds to step 652, and controller 52 subsequently operates actuator 46 to pull the left rear axle 26 toward the chassis 42 at step 654. Control then proceeds to step 660 where control provides notifications to the driver of relevant system information through messaging screens (e.g., displays 64, 74). Control can then proceed to optional system data operations shown in FIG. 13.

Figure 11:
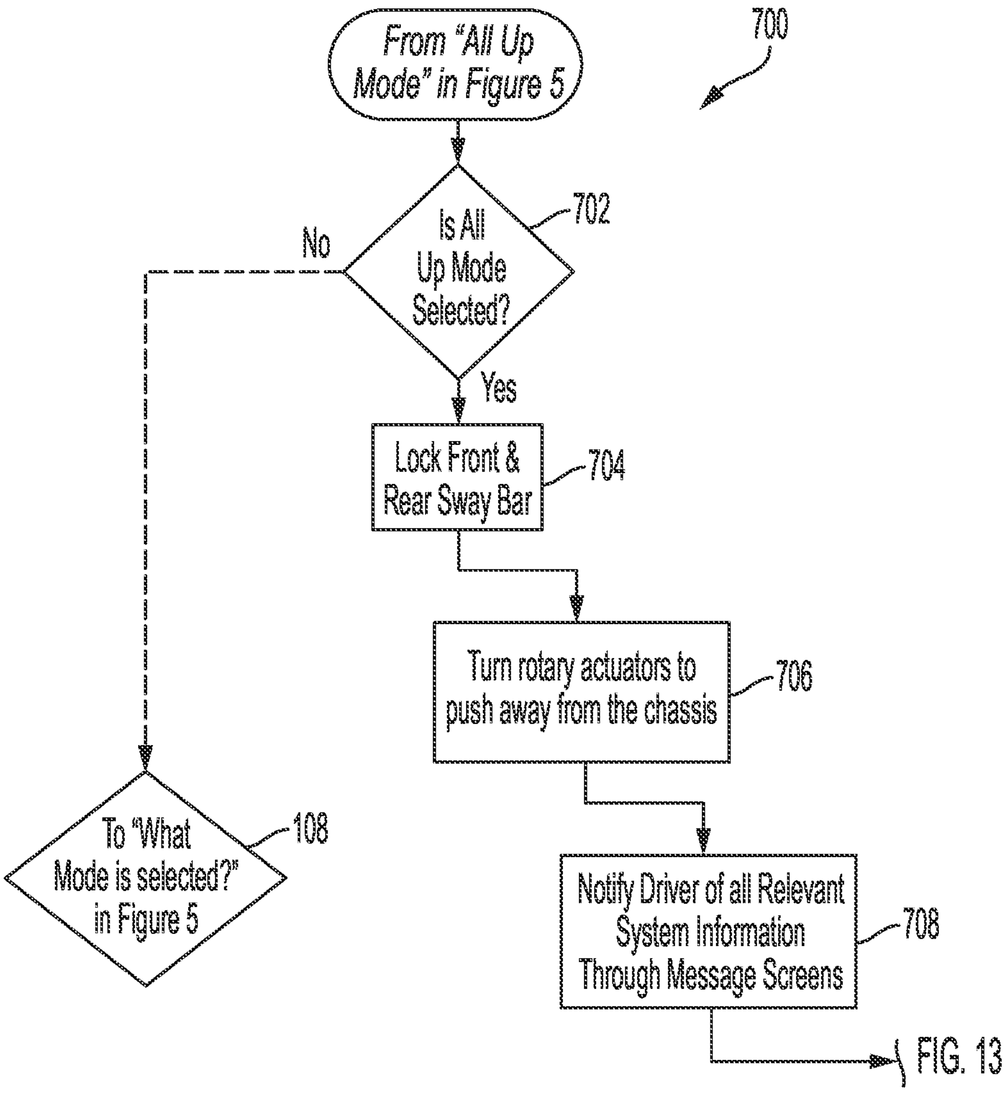
FIG. 11 is a flow diagram of an example method of operating the vehicle attitude adjustment system in an all up adjustment mode, in accordance with the principles of the present application.

FIG. 11 illustrates an example method 700 of operating the vehicle attitude adjustment system 50 in the manual control All Up Mode 120. In the example embodiment, the method begins at step 702 and controller 52 determines if All Up Mode is selected, for example, via touch screen 76. If no, control returns to step 108 (FIG. 5). If yes, at step 704, controller 52 locks the front and rear sway bars 40 via disconnect mechanism 44. At step 706, controller 52 subsequently operates actuators 46 to push both the front and rear axles 36, 26 away from the chassis 42. Control then proceeds to step 708 where control provides notifications to the driver of relevant system information through messaging screens (e.g., displays 64, 74). Control can then proceed to optional system data operations shown in FIG. 13.

Figure 12:
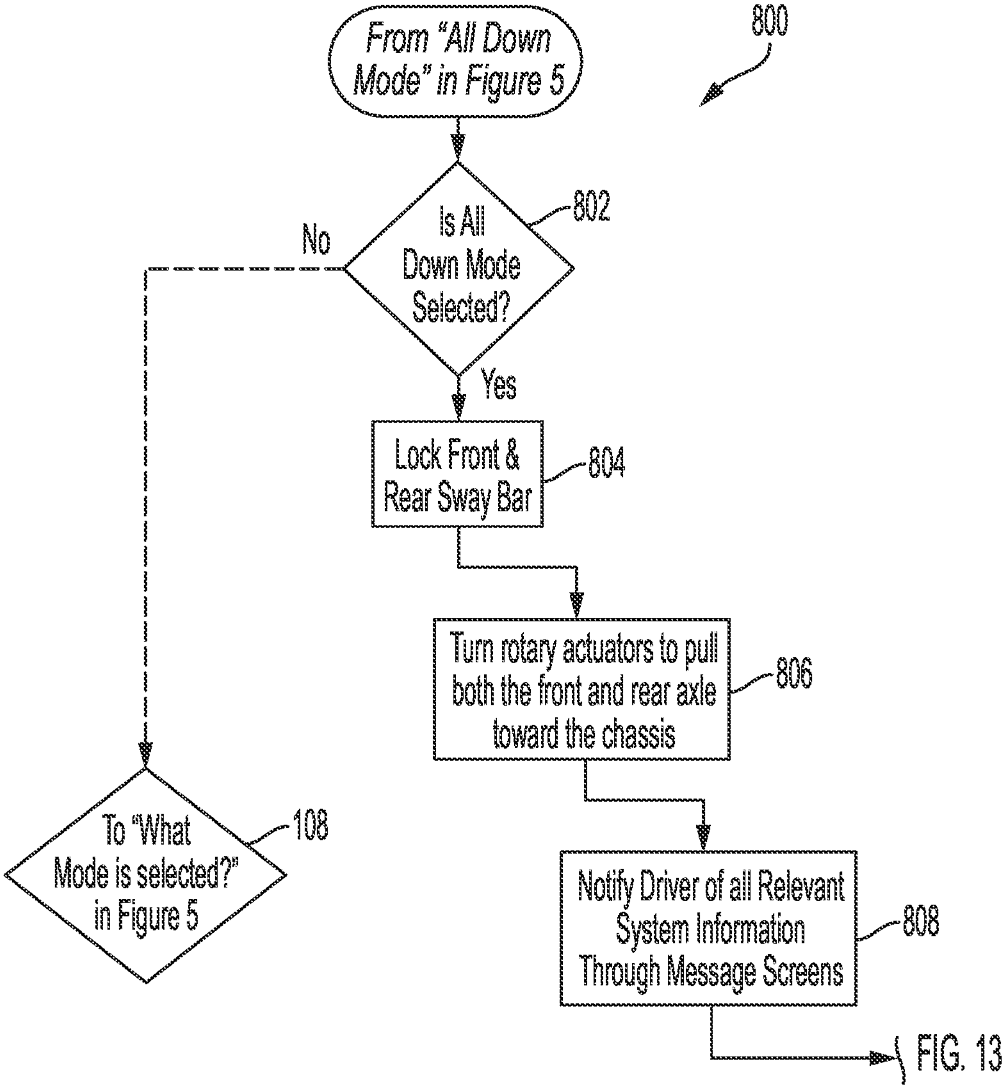
FIG. 12 is a flow diagram of an example method of operating the vehicle attitude adjustment system in an all down adjustment mode, in accordance with the principles of the present application.

FIG. 12 illustrates an example method 800 of operating the vehicle attitude adjustment system 50 in the manual control All Down Mode 122. In the example embodiment, the method begins at step 802 and controller 52 determines if All Down Mode is selected, for example, via touch screen 76. If no, control returns to step 108 (FIG. 5). If yes, at step 804, controller 52 locks the front and rear sway bars 40 via disconnect mechanism 44. At step 806, controller 52 subsequently operates actuators 46 to pull both the front and rear axles 36, 26 toward the chassis 42. Control then proceeds to step 808 where control provides notifications to the driver of relevant system information through messaging screens (e.g., displays 64, 74). Control can then proceed to optional system data operations shown in FIG. 13.

Figure 13:
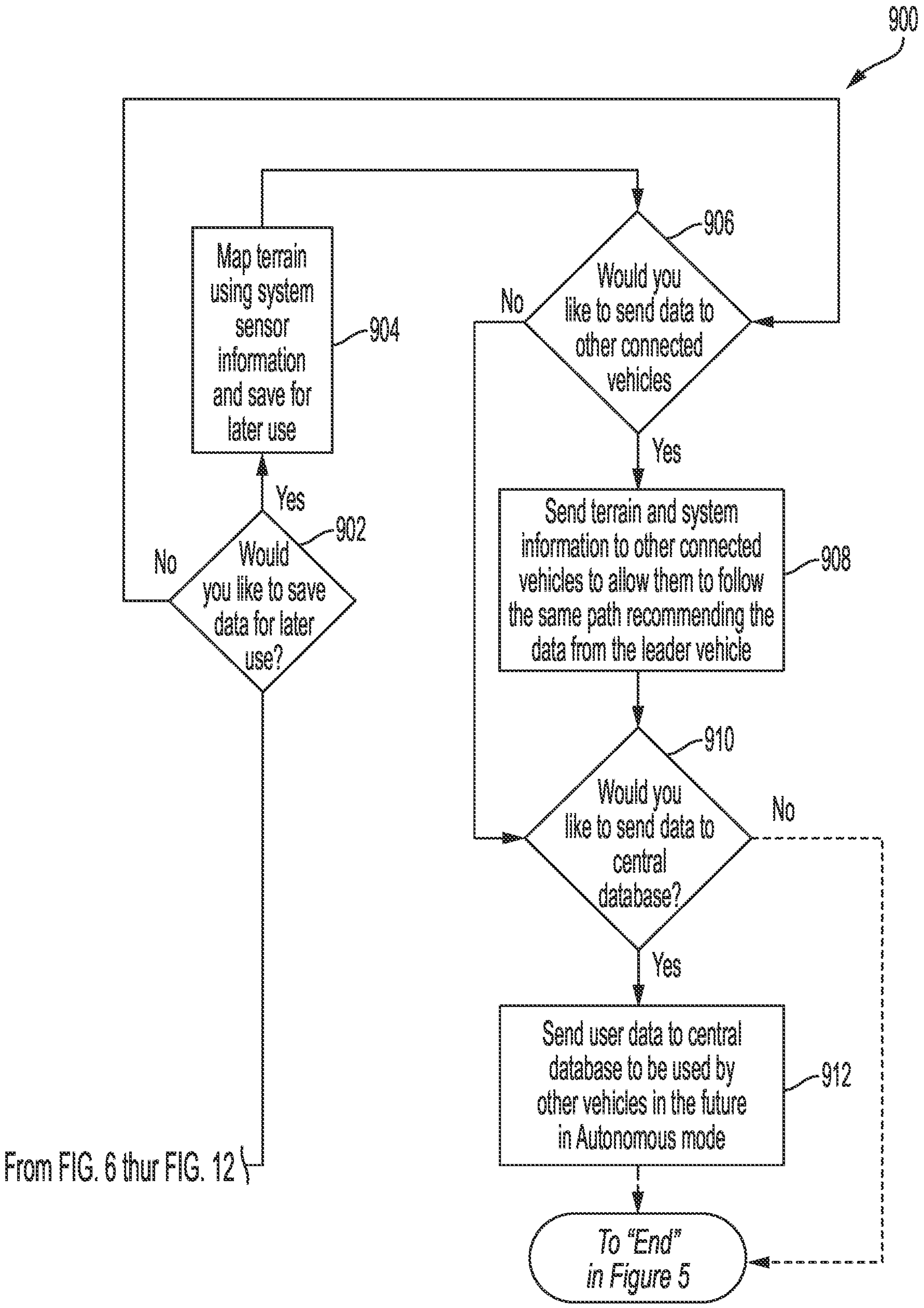
FIG. 13 is a flow diagram of an example method of data control when operating the vehicle attitude adjustment system, in accordance with the principles of the present application.

FIG. 13 illustrates an example method 900 of data control when utilizing the vehicle attitude adjustment system 50. At step 902, controller determines if the user would like to save the operation data (e.g., height and wheel, chassis, and axle location) for later use, for example, via driver use of soft buttons on touch screen 76. If no, control proceeds to step 906. If yes, control proceeds to step 904 and the controller maps the terrain using system sensor information and saves for later use. Control then proceeds to step 906 where controller 52 determines if the user would like to send the operation data to other connected vehicles, for example, via driver use of soft buttons on touch screen 76.

If no, control proceeds to step 910. If yes, control proceeds to step 908 and controller 52 sends terrain and system information to other connected vehicles (e.g., via communications hub 72), for example, to allow them to follow the same path with the recommending data from the leader vehicle. Control then proceeds to step 910 and controller 52 determines if the user would like to send the user data to the central database 80. If yes, control proceeds to step 912 and controller 52 sends user data to the central database 80, for example, to be used by other vehicles in a future Autonomous Mode. If no, or if the data is sent to the central database 80, control then proceeds to step 104 (FIG. 5) and the operation ends.

Described herein are systems and methods for adjusting vehicle attitude. The systems include a user interface that enables a user to select between autonomous/automatic and manual control modes to adjust vehicle attitude via actuators located on sway bar assemblies. In autonomous mode, the vehicle utilizes previously stored terrain mapping/GPS track data from other users to adjust vehicle attitude. In automatic mode, the vehicle automatically adjusts the actuators to keep the body as close to level as possible. In manual control mode, the user can choose between front/rear adjustment, right/left adjustment, four corners adjustment, all up, and all down modes for manual attitude adjustment. These adjustments allow changing the attitude of the vehicle independent of the axles/tire surface, thereby improving weight transfer and driver confidence.

The described systems provide numerous advantages and benefits including: improved approach, break over, and departure angles; pulling the front of the vehicle down as far as possible on steep climbs to counteract vehicle weight transfer; improve driver confidence by reducing the feeling of lightness in the front of the vehicle when making steep climbs; improve weight transfer and driver confidence by lifting the rear of the vehicle on steep climbs; performing opposite actions to improve weight transfer on steep descents; system/method could be used on air suspension vehicles by individually controlling the air bags instead of using the sway bar; reduce weight on the front axle by pulling upward to allow the vehicle to rest the belly skid on a ledge and spin the front tires to either heat them or clear debris from the tread; purposely high center the vehicle on an object (e.g., boulder) to use as a temporary pivot point to rotate the vehicle in a tight turn; assist with tire changing by raising the ride height and placing a support block between the frame rail and the ground and then lower the ride height, effectively lifting the tire off the ground; lowering the vehicle height for object clearance (e.g., entering a low garage); and raising the vehicle height, for example, during river fording.

Additional advantages and benefits include: ability to audit a difficult off-road line or trail in Autonomous Mode in your own vehicle; ability to pull down the front of the vehicle on steep climbs to improve weight transfer, driver confidence, and line of sight; keep the vehicle level when driving laterally on an incline; keep the vehicle as close to level as possible on uneven terrain in Automatic Mode; Improve ingress and egress height of the vehicle when the vehicle is in the All Down Mode; Park the vehicle in garages with low ceiling height; lower the vehicle for areas that have low clearance; attach trailers without leaving the driver seat; raise the vehicle up to improve wading height for water fording; and raise the vehicle to clear an obstacle.

As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A vehicle, comprising:
a chassis;
an axle;
a sway bar assembly coupled between the chassis and the axle; and
a pair of opposed actuators configured to move the sway bar assembly relative to the axle to thereby move at least a portion of the chassis toward or away from the axle to adjust an attitude of the vehicle,
wherein the sway bar assembly comprises:
a lateral bar extending in a generally cross-car direction; and
a pair of opposed lateral arms coupled to opposite ends of the lateral bar,
wherein the opposed actuators are each operably coupled to one of the lateral arms and configured to rotate the respective lateral arm relative to a longitudinal axis of the lateral bar to adjust the vehicle attitude,
wherein the opposed actuators are respectively coupled to the opposite ends of the lateral bar and configured to rotate the associated lateral arm relative to the lateral bar longitudinal axis.

2. A vehicle, comprising:
a chassis;
an axle;
a sway bar assembly coupled between the chassis and the axle;
a pair of opposed actuators configured to move the sway bar assembly relative to the axle to thereby move at least a portion of the chassis toward or away from the axle to adjust an attitude of the vehicle,
wherein the sway bar assembly comprises:
a lateral bar extending in a generally cross-car direction; and
a pair of opposed lateral arms coupled to opposite ends of the lateral bar,
wherein the opposed actuators are each operably coupled to one of the lateral arms and configured to rotate the respective lateral arm relative to a longitudinal axis of the lateral bar to adjust the vehicle attitude; and
a disconnect mechanism configured to disconnect left and right sides of the sway bar assembly such that the left and right sides of the sway bar assembly are independently and respectively adjustable by the opposed actuators relative to the axle.

3. A vehicle, comprising:
a chassis;
an axle;
a sway bar assembly coupled between the chassis and the axle; and
a pair of opposed actuators configured to move the sway bar assembly relative to the axle to thereby move at least a portion of the chassis toward or away from the axle to adjust an attitude of the vehicle,
wherein the sway bar assembly comprises:
a lateral bar extending in a generally cross-car direction; and
a pair of opposed lateral arms coupled to opposite ends of the lateral bar,
wherein the opposed actuators are each operably coupled to one of the lateral arms and configured to rotate the respective lateral arm relative to a longitudinal axis of the lateral bar to adjust the vehicle attitude,
wherein the sway bar assembly further includes a pair of opposed end plates disposed at each end of the lateral bar and coupled to the chassis.

4. A method of adjusting the attitude of a vehicle having a chassis, front and rear axles, a front sway bar assembly coupled between the front axle and the chassis, a rear sway bar assembly coupled between the rear axle and the chassis, a disconnect mechanism operably associated with and configured to selectively disconnect left and right sides of each of the front and rear sway bar assemblies, wherein each of the front and rear sway bar assemblies includes a lateral bar, a pair of opposed lateral arms coupled to opposite ends of the lateral bar, and opposed actuators each coupled to one of the lateral arms and configured to rotate the respective lateral arm relative to a longitudinal axis of the lateral bar to selectively adjust an attitude of the vehicle, the method comprising:

providing at least one user selectable option to adjust the attitude of the vehicle;

determining a user selected option of the provided at least one user selectable option;

actuating the disconnect mechanism to connect or disconnect the front and rear sway bar assemblies based on the user selected option; and adjusting, based on the user selected option, one or more of the actuators to adjust the attitude of the vehicle.

5. The method of claim 4, wherein the vehicle further includes a touchscreen display, and wherein the step of providing at least one user selectable option includes displaying a soft button on the touchscreen display for each user selectable option.

6. The method of claim 5, wherein the at least one user selectable option comprises:

an autonomous mode configured to adjust the one or more actuators to position wheels of the vehicle in locations corresponding to predetermined locations in terrain mapping/GPS track data received from a central database;

an automatic mode configured to automatically adjust the one or more actuators to position a body of the vehicle as close to horizontal as possible;

a front/rear mode configured to adjust the one or more actuators to independently adjust the attitude of a front and rear of the vehicle;

a left/right mode configured to adjust the one or more actuators to independently adjust the attitude of a left side and a right side of the vehicle;

a four corners mode configured to independently adjust the one or more actuators to independently adjust the attitude of a front left, a front right, a rear left, and a rear right corner of the vehicle;

an all up mode configured to adjust the one or more actuators to adjust the attitude of the vehicle to a fully raised position; and an all down mode configured to adjust the one or more actuators to adjust the attitude of the vehicle to a fully lowered position.

7. The method of claim 4, wherein the step of providing at least one user selectable option to adjust the attitude of the vehicle comprises:

providing a first set of user selectable options to select (i) a front of the vehicle, (ii) a rear of the vehicle, (iii) a left side of the vehicle, (iv) a right side of the vehicle, (v) a front left of the vehicle, (vi) a front right of the vehicle, (vii) a rear left of the vehicle, and (viii) a rear right of the vehicle; and providing a second set of user selectable options to select (i) an upward movement or (ii) a downward movement; and wherein the step of adjusting, based on the user selected option, one or more of the actuators to adjust the attitude of the vehicle further includes:

adjusting, based on the user selected first set of options and user selected second set of options, one or more of the actuators to adjust the attitude of the vehicle.

8. The method of claim 4, further comprising, after the step of adjusting one or more of the actuators to adjust the attitude of the vehicle:

providing a user selectable option to save operational data of the vehicle attitude adjustment;

mapping a terrain of the vehicle during the vehicle attitude adjustment; and providing a user selectable option to send the operational data to other connected vehicles and/or a central database for future use by other vehicles.

* * * * *